US012326716B2

(12) United States Patent
Li et al.

(10) Patent No.: US 12,326,716 B2
(45) Date of Patent: Jun. 10, 2025

(54) METHOD AND APPARATUS FOR DETERMINING PRODUCT MANUFACTURING PROGRAM, DEVICE AND STORAGE MEDIUM

(71) Applicant: Saimeite Technology Co., Ltd., Suzhou (CN)

(72) Inventors: Gangjiang Li, Suzhou (CN); Youhui Zhang, Suzhou (CN)

(73) Assignee: Saimeite Technology Co., Ltd., Jiangsu (CN)

( * ) Notice: Subject to any disclaimer, the term of this patent is extended or adjusted under 35 U.S.C. 154(b) by 360 days.

(21) Appl. No.: 17/956,650

(22) Filed: Sep. 29, 2022

(65) Prior Publication Data

US 2023/0305527 A1 Sep. 28, 2023

(30) Foreign Application Priority Data

Mar. 23, 2022 (CN) .......................... 202210291587.0

(51) Int. Cl.
*G05B 19/4155* (2006.01)
*G05B 19/418* (2006.01)

(52) U.S. Cl.
CPC ... *G05B 19/4155* (2013.01); *G05B 19/41885* (2013.01); *G05B 2219/33301* (2013.01); *G05B 2219/36237* (2013.01)

(58) Field of Classification Search
None
See application file for complete search history.

(56) References Cited

U.S. PATENT DOCUMENTS

2017/0123767 A1 5/2017 Wang et al.

FOREIGN PATENT DOCUMENTS

| CN | 109459996 A | 3/2019 | |
|---|---|---|---|
| CN | 109407630 B | * 8/2020 | ....... G05B 19/41865 |
| CN | 112101725 A | 12/2020 | |

(Continued)

OTHER PUBLICATIONS

Translation of CN-109407630-B (Year: 2020).*

(Continued)

*Primary Examiner* — Ryan A Jarrett
(74) *Attorney, Agent, or Firm* — Davis Wright Tremaine LLP

(57) ABSTRACT

A method and an apparatus for determining a product manufacturing program, a device and a storage medium are provided. According to an information identifier configured for describing target key information of the product manufacturing requirement of the target user, a first product manufacturing program with the same information identifier as the target key information is determined from a product manufacturing program library; an operating parameter of a product manufacturing device when manufacturing the target product is input into the first product manufacturing program to simulate manufacturing of the target product, to obtain a first product parameter of a first product obtained, and the first product parameter is compared with a standard product parameter to obtain a first comparison result; when the first product parameter is same as the standard product parameter, the first product manufacturing program is determined as a first target product manufacturing program.

9 Claims, 3 Drawing Sheets

(56) References Cited

FOREIGN PATENT DOCUMENTS

| CN | 112633731 A | 4/2021 |
| CN | 112685006 A | 4/2021 |
| CN | 113987670 A | 1/2022 |

OTHER PUBLICATIONS

The State Intellectual Property Office of People's Republic of China, "First Office Action" in Application No. 202210672973.4, Jul. 9, 2023, 16 pages.

* cited by examiner

METHOD AND APPARATUS FOR DETERMINING PRODUCT MANUFACTURING PROGRAM, DEVICE AND STORAGE MEDIUM

CROSS-REFERENCE TO RELATED APPLICATION

This application claims priority to Chinese Patent Application No. 202210291587.0, filed on Mar. 23, 2022, entitled "METHOD AND APPARATUS FOR DETERMINING PRODUCT MANUFACTURING PROGRAM, DEVICE AND STORAGE MEDIUM," the disclosure of which is hereby incorporated herein in its entirety.

TECHNICAL FIELD

The present disclosure relates to the field of automated manufacturing, and in particular, to a method and an apparatus for determining a product manufacturing program, a device and storage medium.

BACKGROUND ART

In the prior art, when an automated manufacturing device is used for product manufacturing, it is necessary to design a product manufacturing program for manufacturing the product according to the product type and product parameter of the product to be manufactured, so that the automated manufacturing device can manufacture the product according to the product manufacturing program.

During the researches, the inventor found that when the product manufacturing program is used to manufacture the product, two situations may occur: the first is that the actual product obtained after using the original product manufacturing program to perform the actual production of the product does not meet the product standard, and the original product manufacturing program needs to be revised again, so that the automated manufacturing device can produce products that meet the product standards, according to the adjusted product manufacturing program; and the second is that the actual product obtained after using the original product manufacturing program to perform the actual production of the product meets the product standard, then the original product manufacturing program can be directly used as the product manufacturing program of manufacturing the product to produce the product, wherein regardless of whether the products produced through the original product manufacturing program meet the product standards, the actual production of the products needs to be performed by using automated manufacturing device in advance, that is, the product manufacturing program for manufacturing the target product needs to be determined in a specific environment (an environment with the automated manufacturing device), thereby increasing the conditional restrictions when determining the product manufacturing program.

SUMMARY

In view of this, the purpose of the present disclosure is to provide a method, and an apparatus for determining a product manufacturing program, a device and storage medium, which are beneficial to reduce the conditional restrictions when determining the product manufacturing program.

In a first aspect, embodiments of the present disclosure provide a method for determining a product manufacturing program, which is applicable to an automated product manufacturing system, wherein the product manufacturing program is used to control the automated product manufacturing system to manufacture a target product according to a product manufacturing requirement of a target user, and the method comprises steps of:

determining, according to an information identifier configured for describing target key information of the product manufacturing requirement of the target user, a first product manufacturing program with the same information identifier as the target key information, from a product manufacturing program library used to store product manufacturing programs;

inputting into the first product manufacturing program an operating parameter of a product manufacturing device configured to manufacture the target product when manufacturing the target product, to simulate manufacturing of the target product, so as to obtain a first product parameter of a first product obtained after the simulating, and comparing the first product parameter with a standard product parameter to obtain a first comparison result; and determining the first product manufacturing program as a first target product manufacturing program, when the first comparison result is that the first product parameter is the same as the standard product parameter, so that the automated product manufacturing system manufactures the target product according to the first target product manufacturing program.

Optionally, after comparing the first product parameter with the standard product parameter to obtain the first comparison result, the method further comprises:

inputting the operating parameter into a second product manufacturing program to simulate the manufacturing of the target product, when the first comparison result is that the first product parameter is different from the standard product parameter, so as to obtain a second product parameter of a second product obtained after the simulating, and comparing the second product parameter with the standard product parameter to obtain a second comparison result, wherein the second product manufacturing program is a product manufacturing program obtained by the target user modifying the first product manufacturing program according to the first comparison result; and determining the second product manufacturing program as a second target product manufacturing program, when the second comparison result is that the second product parameter is the same as the standard product parameter, so that the automated product manufacturing system manufactures the target product according to the second target product manufacturing program.

Optionally, after determining the first product manufacturing program as a first target product manufacturing program, the method comprises:

determining, according to a product type identifier configured for the first target product manufacturing program, a server partition with the same product type identifier as the first target product manufacturing program, from a server configured to store product manufacturing programs, and encrypting the first target product manufacturing program, and then uploading it to the server partition for storage.

Optionally, before the step of determining according to an information identifier configured for describing target key information of the product manufacturing requirement of the target user a first product manufacturing program with the same information identifier as the target key information from a product manufacturing program library used to store product manufacturing programs, the method further comprises:

inputting, into a trained requirement analysis model, a text inputted by the target user used to describe the product manufacturing requirement, to obtain a target keyword used to describe the product manufacturing requirement, and configuring a device type of the product manufacturing device as the information identifier of the target keyword.

In a second aspect, embodiments of the present disclosure provide an apparatus for determining a product manufacturing program, the apparatus comprising:

a first product manufacturing program determination module, configured to determine, according to an information identifier configured for describing target key information of the product manufacturing requirement of the target user, a first product manufacturing program with the same information identifier as the target key information, from a product manufacturing program library used to store product manufacturing programs;

a first comparison result determination module, configured to input into the first product manufacturing program an operating parameter of a product manufacturing device configured to manufacture the target product when manufacturing the target product, to simulate manufacturing of the target product, so as to obtain a first product parameter of a first product obtained after the simulating, and compare the first product parameter with a standard product parameter to obtain a first comparison result; and a first target product manufacturing program determination module, configured to determine the first product manufacturing program as a first target product manufacturing program, when the first comparison result is that the first product parameter is the same as the standard product parameter, so that the automated product manufacturing system manufactures the target product according to the first target product manufacturing program.

Optionally, the apparatus comprises:

a second comparison result determination module, configured to input the operating parameter into a second product manufacturing program to simulate the manufacturing of the target product, after comparing the first product parameter with the standard product parameter to obtain the first comparison result, when the first comparison result is that the first product parameter is different from the standard product parameter, so as to obtain a second product parameter of a second product obtained after the simulating, and compare the second product parameter with the standard product parameter to obtain a second comparison result, wherein the second product manufacturing program is a product manufacturing program obtained by the target user modifying the first product manufacturing program according to the first comparison result; and a second target product manufacturing program determination module, configured to determine the second product manufacturing program as a second target product manufacturing program, when the second comparison result is that the second product parameter is the same as the standard product parameter, so that the automated product manufacturing system manufactures the target product according to the second target product manufacturing program.

Optionally, the apparatus comprises:

a first target product manufacturing program storage module, configured to determine, according to a product type identifier configured for the first target product manufacturing program, a server partition with the same product type identifier as the first target product manufacturing program, from a server configured to store product manufacturing programs, and encrypt the first target product manufacturing program, and then upload it to the server partition for storage.

Optionally, the apparatus comprises:

an information identifier configuration module, configured to input, into a trained requirement analysis model, a text inputted by the target user used to describe the product manufacturing requirement, to obtain a target keyword used to describe the product manufacturing requirement, and configure a device type of the product manufacturing device as the information identifier of the target keyword, before determining, according to an information identifier configured for describing target key information of the product manufacturing requirement of the target user, a first product manufacturing program with the same information identifier as the target key information from a product manufacturing program library used to store product manufacturing programs.

In the third aspect, embodiments of the present disclosure provide a computer device, which comprises: a processor, a memory, and a bus, wherein the memory stores machine-readable instructions executable by the processor, wherein when the computer device runs, the processor communicates with the memory through the bus, and when the machine-readable instructions are executed by the processor, the steps of the method for determining a product manufacturing program described in any one of the optional embodiments of the first aspect above are executed.

In the fourth aspect, embodiments of the present disclosure provide a computer-readable storage medium, wherein computer programs are stored on the computer-readable storage medium, and when the computer programs are run by a processor, the steps of the method for determining a product manufacturing program described in any one of the optional embodiments of the first aspect above are executed.

The embodiments of present disclosure provide a method and an apparatus for determining a product manufacturing program, a device and a readable storage medium, wherein according to an information identifier configured for describing target key information of the product manufacturing requirement of the target user, a first product manufacturing program with the same information identifier as the target key information is determined from a product manufacturing program library used to store product manufacturing programs, through which steps, the product manufacturing program can be determined from the manufacturing program library according to the configured information identifier, and manual input of the product manufacturing program is not required, which reduces the workload of the target user; the operating parameter of a product manufacturing device configured to manufacture the target product when manufacturing the target product is input into the first product manufacturing program to simulate manufacturing of the target product, so as to obtain a first product parameter of a first product obtained after the simulating, and the first product parameter is compared with a standard product parameter to obtain a first comparison result, through which steps, the parameter of the product obtained by the simulated manufacturing is compared with the standard product parameter, thus it is possible to know, without actual manufacturing, whether the current product manufacturing program meets the requirements of manufacturing the target product; and when the first comparison result is that the first product parameter is the same as the standard product parameter, the first product manufacturing program is determined as a first target product manufacturing program, so that the automated product manufacturing system manufactures the target product according to the first target product manufacturing program. In the above-mentioned method, before using the automated manufacturing device to actually manufacture the target product, the manufacturing of the target product is simulated, and the target product manufacturing program for actually manufacturing the target product is determined according to the comparison result between the product parameter obtained by simulating and the standard product parameter, thereby reducing the conditional restrictions when determining the product manufacturing program.

In order to make the above-mentioned objects, features and advantages of the present disclosure more clearly understood, preferred embodiments are given below, and detailed description is made as follows in conjunction with the accompanying drawings.

BRIEF DESCRIPTION OF DRAWINGS

In order to more clearly illustrate the technical solutions of the embodiments of the present disclosure, drawings which need to be used in the embodiments will be introduced briefly below, it should be understood that the following drawings only show some embodiments of the present disclosure, therefore it should not be seen as a limitation of scope. Those ordinarily skilled in the art still could obtain other related drawings in light of these drawings, without using any inventive efforts.

DETAILED DESCRIPTION OF EMBODIMENTS

Figure 1:
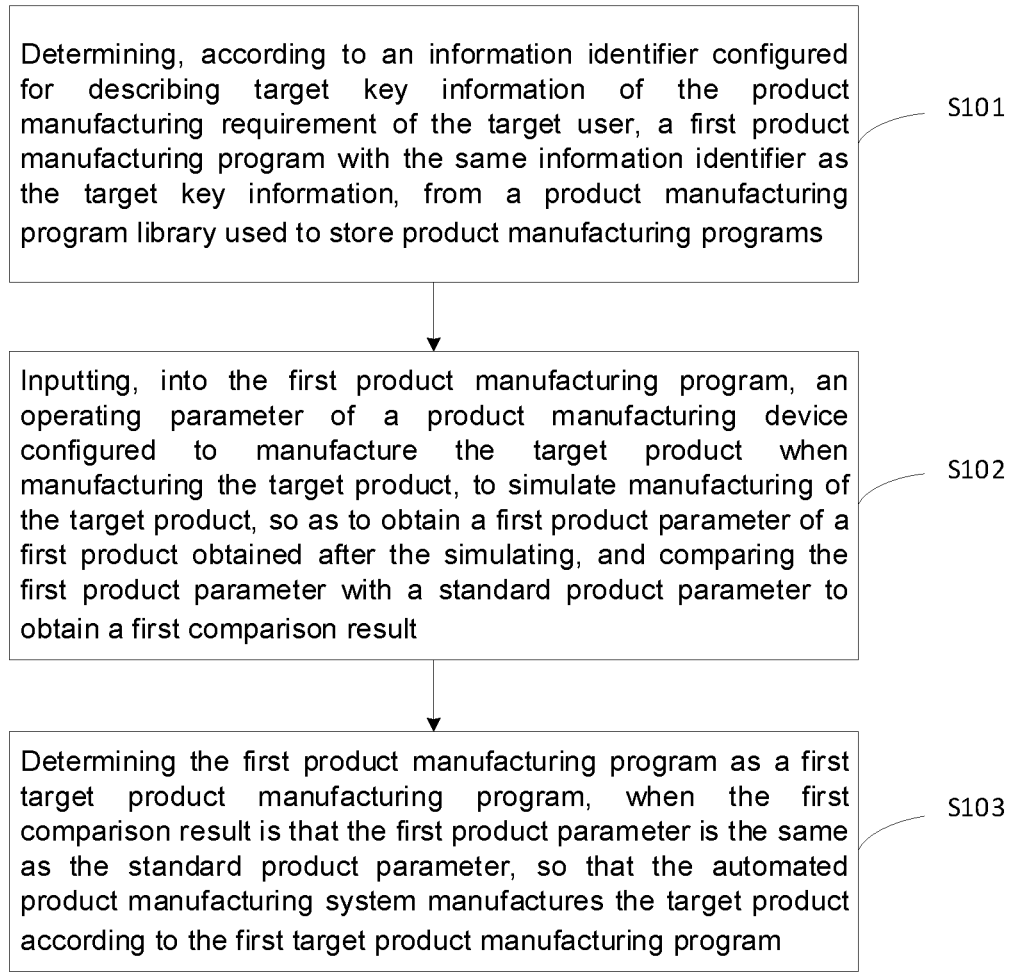
FIG. 1 shows a flowchart of a method for determining a product manufacturing program provided by Embodiment 1 of the present disclosure.

In order to make the purposes, technical solutions and advantages of the embodiments of the present disclosure clearer, the technical solutions in the embodiments of the present disclosure will be described clearly and completely below with reference to the drawings in the embodiments of the present disclosure. Obviously, the described embodiments are only some of the embodiments of the present disclosure, but not all of the embodiments. The components of the embodiments of the present disclosure generally described and illustrated in the drawings herein may be arranged and designed in a variety of different configurations. Therefore, the following detailed description of the embodiments of the present disclosure provided in the drawings is not intended to limit the scope of the present disclosure as claimed, but is merely representative of selected embodiments of the present disclosure. Based on the embodiments of the present disclosure, all other embodiments obtained by those skilled in the art without making creative work fall within the protection scope of the present disclosure.

Embodiment 1

In order to facilitate the understanding of the present disclosure, the Embodiment 1 of the present disclosure will be described in detail below with reference to the content described in the flowchart of a method for determining a product manufacturing program provided by the Embodiment 1 of the present disclosure shown in FIG. 1.

Referring to FIG. 1, FIG. 1 shows a flowchart of a method for determining a product manufacturing program provided by Embodiment 1 of the present disclosure, and the method includes steps S101-S103:

S101: determining, according to an information identifier configured for describing target key information of the product manufacturing requirement of the target user, a first product manufacturing program with the same information identifier as the target key information, from a product manufacturing program library used to store product manufacturing programs.

Specifically, the product manufacturing requirement usually includes the product type of the target product, the manufacturing process of the target product, the device model and device name of the product manufacturing device configured to manufacture the product, etc.; the target key information used to describe the product manufacturing requirement includes the product type for describing the product type of the target product, the product process for describing the manufacturing process of the target product, the manufacturing device model for describing the device model of the product manufacturing device configured to manufacture the product, and the device name for describing the production device name of the device model of the product manufacturing device configured to manufacture the product, etc.

First, the product manufacturing requirements of user (target user or historical user) when needing to use the product manufacturing device to perform product manufacturing are summarized, the target key information that can reflect the key information of the product manufacturing requirements is determined according to the manufacturing requirement of each product, and an information identifier is configured for each target key information, wherein the information identifier is used to determine, from the product manufacturing program library, the first product manufacturing program with the same information identifier, the information identifier includes but is not limited to keywords in the target key information, and the product manufacturing program library includes at least one product manufacturing program that can be run on the product manufacturing device.

Secondly, after the information identifier is configured for the target key information, the product manufacturing program library is traversed, and a product manufacturing program with the same information identifier as the target key information in the product manufacturing program library is determined, and this product manufacturing program is the first product manufacturing program.

S102: inputting, into the first product manufacturing program, an operating parameter of a product manufacturing device configured to manufacture the target product when manufacturing the target product, to simulate manufacturing of the target product, so as to obtain a first product parameter of a first product obtained after the simulating, and comparing the first product parameter with a standard product parameter to obtain a first comparison result.

Specifically, the operating parameter includes, but is not limited to parameter and information used to indicate the operating state that the product manufacturing device needs to meet when manufacturing the target product, such as device connection port and device IP address; after simulating the manufacturing of the target product by inputting the operating parameter into the first product manufacturing program, the first product parameter of the first product obtained by the simulated manufacturing can be obtained, wherein the first product parameter includes, but is not limited to data used to characterize product attributes, such as product size, product density, and product quality.

In order to detect product quality, the standard parameter of each product (that is, the parameter of a standard product that meets the usage or manufacturing standard) is usually pre-stored in the database, and after the first product parameter is collected, the standard parameter of the first product is compared with the first product parameter to obtain a first comparison result.

S103: determining the first product manufacturing program as a first target product manufacturing program, when the first comparison result is that the first product parameter is the same as the standard product parameter, so that the automated product manufacturing system manufactures the target product according to the first target product manufacturing program.

Specifically, when the first product parameter obtained by simulating is the same as the standard product parameter, it means that the first product meets the manufacturing standard, and the first product manufacturing program is determined as the first target product manufacturing program, so that the automated product manufacturing system manufactures the target product according to the first target product manufacturing program.

In a feasible embodiment, after the first comparison result is obtained by comparing the first product parameter with the standard product parameter, the method further includes:
  inputting, when the first comparison result is that the first product parameter is different from the standard product parameter, the operating parameter into the second product manufacturing program to simulate the manufacturing of the target product, so as to obtain the second product parameter of the second product obtained after the simulating, and comparing the second product parameter with the standard product parameter to obtain a second comparison result, wherein the second product manufacturing program is a product manufacturing program obtained by the target user modifying the first product manufacturing program according to the first comparison result.

Specifically, when the first comparison result is that the first product parameter is different from the standard product parameter, it means that an error occurs in the first product manufacturing program, then the first product manufacturing program needs to be modified, and since the first product manufacturing program consists of a fixed un-modifiable first product manufacturing program framework and a modifiable custom script part, the second product manufacturing program is obtained by modifying the custom script part in the first product manufacturing program; and the operating parameter is input into the second product manufacturing program to simulate the manufacturing of the target product, so as to obtain the second product parameter of the second product after the simulating, and the second product parameter is compared with the standard product parameter to obtain a second comparison result (for the above process, refer to the comparison between the first product parameter and the standard product parameter in step S102).

The second product manufacturing program is determined as a second target product manufacturing program, when the second comparison result is that the second product parameter is the same as the standard product parameter, so that the automated product manufacturing system manufactures the target product according to the second target product manufacturing program.

Specifically, when the second comparison result is that the second product parameter is different from the standard product parameter, the custom script part in the second product manufacturing program is modified, and the product manufacturing program obtained by modifying is used to simulate the manufacturing of the target product, until the product parameter of the target product obtained by simulating is the same as the standard product parameter, and the product manufacturing program is determined as the final product manufacturing program, so that the automated manufacturing system can manufacture the target product according to the final product manufacturing procedure.

In a feasible embodiment, after the first product manufacturing program is determined as the first target product manufacturing program, the method includes:
  determining, according to a product type identifier configured for the first target product manufacturing program, a server partition with the same product type identifier as the first target product manufacturing program, from a server configured to store product manufacturing programs, and encrypting the first target product manufacturing program, and then uploading it to the server partition for storage.

Specifically, in order to enable the target product manufacturing program to be effectively stored and shared, in the local area network server or Internet server configured to store target product manufacturing programs, the server partition with the same product type identifier is determined according to the product type identifier configured for the target product manufacturing program, wherein the product type identifier includes but is not limited to product name, product type, product use, and product workmanship, and the like; then, the target product manufacturing program is uploaded to the corresponding server partition for storage, that is, the target product manufacturing programs configured to manufacture products of the same type or with the same usage will be stored in the same server partition, which facilitates the query of the target product program in the server.

In a feasible embodiment, before determining according to an information identifier configured for describing target key information of the product manufacturing requirement of the target user a first product manufacturing program with the same information identifier as the target key information from a product manufacturing program library used to store product manufacturing programs, the method further comprises:
  Inputting, into a trained requirement analysis model, a text inputted by the target user used to describe the product manufacturing requirement, to obtain a target keyword used to describe the product manufacturing requirement, and configuring a device type of the product manufacturing device as the information identifier of the target keyword.

Specifically, in order to improve the understanding of product manufacturing requirement of the target user, the trained requirement analysis model is used to analyze the text used to describe the target user's product manufacturing requirement (it is also possible to collect the user's voice input for product manufacturing requirement by using a voice-to-text converter, which converts the information of voice input into text), the text is taken as an input, which is inputted into the requirement analysis model, to obtain the target keyword used to describe the product manufacturing requirement, and the device type of the product manufacturing device (product name, product process, or device name) is configured as the information identifier of the target keyword, so that the first product manufacturing program with the same information identifier can be determined from the manufacturing program library used to store product manufacturing programs, according to the information identifier of the target keyword.

In order to better illustrate the method for determining a product manufacturing program provided in Embodiment 1 of the present disclosure, the present disclosure will be described in conjunction with a specific method for determining a product manufacturing program, the method includes:

collecting the user information of the currently logged-in target user, and determining, according to the access authority of the user account in the user information, the business model that the target user can call from the business database configured to store the business models, wherein the business model includes information such as solutions, customer cases, and development and test documents related to the device;

providing the target user with an inputable search box, when the target user has the authority to call the development and test document information and calls the development and test document information, and prompting the target user to input into the search box the text used to describe the product manufacturing requirement, wherein a background inputs the text in the search box into the requirement analysis model to obtain the keyword used to describe the product manufacturing requirement, and determines a product manufacturing program used to simulate the manufacturing of the product, according to the information identifier of the keyword, from a manufacturing program library used to store product manufacturing programs;

inputting into the product manufacturing program the operating parameter of the product manufacturing device when manufacturing the target product, to simulate the manufacturing of the target product, so as to obtain the simulated product parameter, and then comparing the simulated product parameter with the standard product parameter to determine whether the simulated product meets the standard of user requirement; and when the simulated product parameter is the same as the standard product parameter, which means that the product manufacturing device can manufacture the target product according to the product manufacturing program, determining the product manufacturing program as the product manufacturing program used to actually manufacture the target product, encrypting the target product manufacturing program and then uploading it to the target server partition for storage, and simultaneously using the product manufacturing program to manufacture the target product; when the simulated product parameter is different from the standard product parameter, modifying the custom script part in the product manufacturing program according to the comparison result, until the simulated product parameter obtained by the simulated manufacturing of the modified product manufacturing program is the same as the standard product parameter, encrypting the modified product manufacturing program and then uploaded it to the corresponding target server partition for storage, and simultaneously using the product manufacturing program to manufacture the target product.

Embodiment 2

Figure 2:
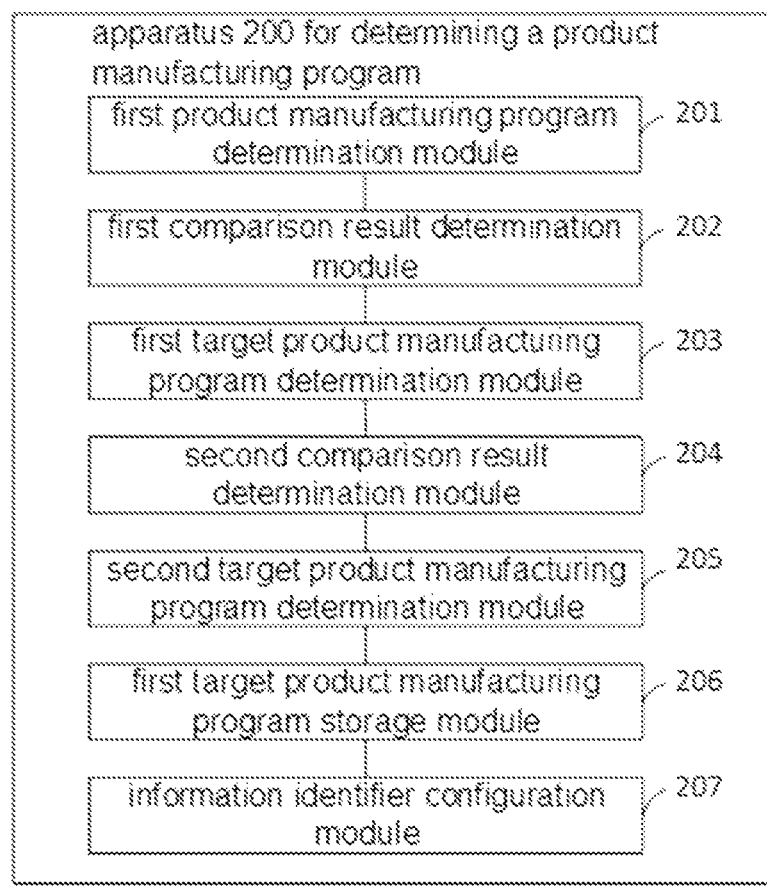
FIG. 2 shows a schematic structural view of an apparatus for determining a product manufacturing program provided by Embodiment 2 of the present disclosure.

Referring to FIG. 2, FIG. 2 shows a schematic structural view of an apparatus for determining a product manufacturing program provided by Embodiment 2 of the present disclosure, wherein as shown in FIG. 2, the apparatus 200 for determining a product manufacturing program provided by Embodiment 2 of the present disclosure includes:

a first product manufacturing program determination module 201, configured to determine, according to an information identifier configured for describing target key information of the product manufacturing requirement of the target user, a first product manufacturing program with the same information identifier as the target key information from a product manufacturing program library used to store product manufacturing programs;

a first comparison result determination module 202, configured to input into the first product manufacturing program an operating parameter of a product manufacturing device configured to manufacture the target product when manufacturing the target product, to simulate manufacturing of the target product, so as to obtain a first product parameter of a first product obtained after the simulating, and compare the first product parameter with a standard product parameter to obtain a first comparison result; and a first target product manufacturing program determination module 203, configured to determine the first product manufacturing program as a first target product manufacturing program, when the first comparison result is that the first product parameter is the same as the standard product parameter, so that the automated product manufacturing system manufactures the target product according to the first target product manufacturing program.

In a feasible embodiment, the apparatus includes:

a second comparison result determination module 204, configured to input the operating parameter into the second product manufacturing program to simulate the manufacturing of the target product, after comparing the first product parameter with the standard product parameter to obtain a first comparison result and when the first comparison result is that the first product parameter is different from the standard product parameter, so as to obtain a second product parameter of a second product obtained after the simulating, and compare the second product parameter with the standard product parameter to obtain a second comparison result, wherein the second product manufacturing program is a product manufacturing program obtained by the target user modifying the first product manufacturing program according to the first comparison result; and a second target product manufacturing program determination module 205, configured to determine the second product manufacturing program as a second target product manufacturing program, when the second comparison result is that the second product parameter is the same as the standard product parameter, so that the automated product manufacturing system manufactures the target product according to the second target product manufacturing program.

In a feasible embodiment, the apparatus includes:
a first target product manufacturing program storage module 206, configured to determine, according to the product type identifier configured for the first target product manufacturing program, a server partition with the same product type identifier as the first target product manufacturing program from a server configured to store product manufacturing programs, and encrypt the first target product manufacturing program, and then upload it to the server partition for storage.

In a feasible embodiment, the apparatus includes:
an information identifier configuration module 207, configured to input, into a trained requirement analysis model, a text inputted by the target user used to describe the product manufacturing requirement, to obtain a target keyword used to describe the product manufacturing requirement, and configure a device type of the product manufacturing device as the information identifier of the target keyword, before determining, according to an information identifier configured for describing target key information of the product manufacturing requirement of the target user, a first product manufacturing program with the same information identifier as the target key information from a product manufacturing program library used to store product manufacturing programs.

Embodiment 3

Figure 3:
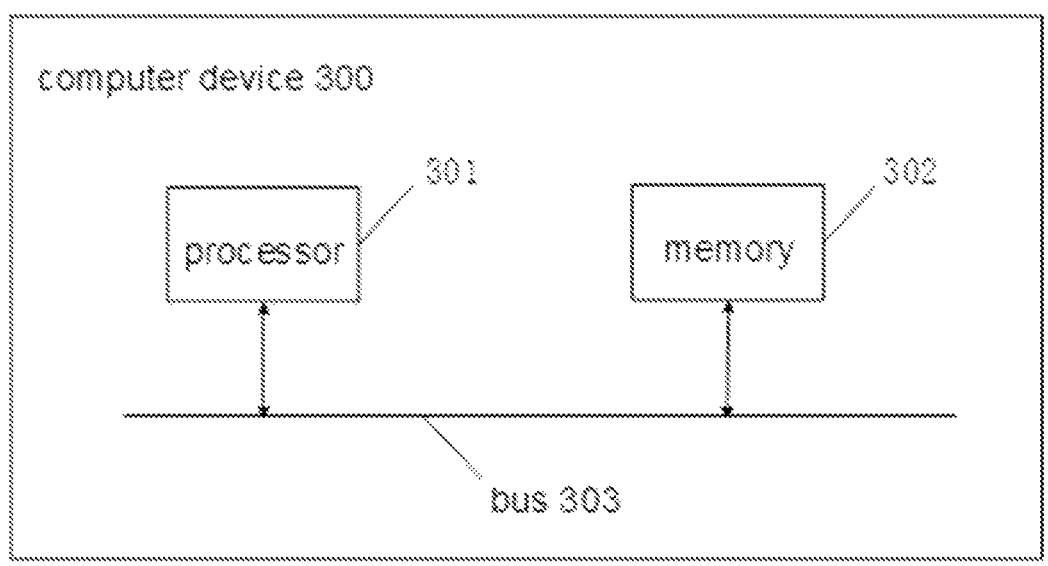
FIG. 3 shows a schematic structural view of a computer device provided by Embodiment 3 of the present disclosure.

Based on the same application concept, referring to FIG. 3, FIG. 3 shows a schematic structural view of a computer device provided by Embodiment 3 of the present disclosure, wherein as shown in FIG. 3, the computer device 300 provided by Embodiment 3 of the present disclosure includes:
a processor 301, a memory 302, and a bus 303, wherein the memory 302 stores machine-readable instructions executable by the processor 301, and when the computer device 300 runs, the processor 301 and the memory 302 communicate with each other through the bus 303, and when the machine-readable instructions are executed by the processor 301, the steps of the method for determining a product manufacturing program shown in the Embodiment 1 above are executed.

Embodiment 4

Based on the same application concept, the embodiment of present disclosure also provides a computer-readable storage medium, wherein computer programs are stored on the computer-readable storage medium, and when the computer programs are run by a processor, the steps of the method for determining a product manufacturing program according to any one of above-mentioned embodiment are executed.

Those skilled in the art can clearly understand that, for the convenience and brevity of description, the specific working processes of the system and apparatus described above can refer to the corresponding processes in the foregoing method embodiments, which will not be repeated here.

The computer program product for determining the product manufacturing program provided by the embodiments of the present disclosure includes a computer-readable storage medium storing program codes, and the instructions included in the program codes can be used to execute the methods described in the foregoing method embodiments, specific embodiment can refer to the method embodiments, which will not be repeated here.

The device for determining a product manufacturing program provided by the embodiment of the present disclosure may be specific hardware on the device or software or firmware installed on the device or the like. The implementation principle and the generated technical effects of the apparatus provided by the embodiments of the present disclosure are the same as those of the foregoing method embodiments, for brief description, the parts not mentioned in the apparatus embodiment can refer to the corresponding content in the foregoing method embodiment. Those skilled in the art can clearly understand that, for the convenience and brevity of the description, the specific working processes of the system, apparatus and unit described above can all refer to the corresponding processes in the above method embodiments, which will not be repeated here.

In the embodiments provided by the present disclosure, it should be understood that the disclosed apparatus and method may be implemented in other manners. The apparatus embodiments described above are only illustrative. For example, the division of the units is only a logical function division. In actual implementation, there may be other division methods. For another example, multiple units or components may be combined or can be integrated into another system, or some features can be ignored, or not implemented. On the other hand, the shown or discussed mutual coupling or direct coupling or communication may be achieved through some communication interfaces, and indirect coupling or communication of apparatuses or units may be electrical, mechanical or in other forms.

The units described as separate parts may or may not be physically separated, and parts displayed as units may or may not be physical units, that is, may be located in one place, or may also be distributed to multiple network units. Some or all of the units may be selected according to actual needs to achieve the purpose of the solution in this embodiment.

In addition, each functional unit in the embodiments provided by the present disclosure may be integrated into one processing unit, or each unit may also exist physically alone, or two or more units may also be integrated into one unit.

The functions, if implemented in the form of software functional units and sold or used as independent products, may be stored in a computer-readable storage medium. Based on such understanding, the technical solution of the present disclosure in essence or the part that contributes to the prior art or the part of the technical solution can be embodied in the form of a software product, the computer software product is stored in a storage medium, which includes several instructions for making a computer device (which may be a personal computer, a server, or a network device, etc.) to execute all or part of the steps of the methods described in the various embodiments of the present disclosure. The aforementioned storage medium includes: U disk, mobile hard disk, Read-Only Memory (ROM), Random Access Memory (RAM), magnetic disk or optical disk and other media that can store program codes.

It should be noted that similar numerals and letters indicate similar items in the following drawings, therefore, once a certain item is defined in one drawing, it does not need to be further defined and explained in the subsequent drawings, besides, the terms "first", "second", "third", etc.

are merely for descriptive purpose, but should not be construed as indicating or implying importance in relativity.

Finally, it should be noted that the above-mentioned embodiments are only specific embodiments of the present disclosure, and are used to illustrate the technical solutions of the present disclosure, but not to limit them. The protection scope of the present disclosure is not limited thereto, although the present disclosure has been described in detail with reference to the foregoing embodiments, those ordinarily skilled in the art should understand that: any person skilled in the art who is familiar with the technical field can still make modifications or can easily think of changes to the technical solutions described in the foregoing embodiments within the technical scope disclosed by the present disclosure, or perform equivalent replacements to some of the technical features thereof; and these modifications, changes or substitutions do not make the essence of the corresponding technical solutions deviate from the spirit and scope of the technical solutions in the embodiments of the present disclosure. All should be included within the protection scope of the present disclosure. Therefore, the protection scope of the present disclosure shall be subject to the protection scope of the claims.

What is claimed is:

1. A method for determining a product manufacturing program, applicable to an automated product manufacturing system, wherein the automated product manufacturing system comprises a device connection port, wherein the product manufacturing program is used to control the automated product manufacturing system to manufacture a target product according to a product manufacturing requirement of a target user, and the method comprises steps of:
   determining, according to an information identifier configured for describing target key information of the product manufacturing requirement of the target user, a first product manufacturing program with the same information identifier as the target key information from a product manufacturing program library used to store product manufacturing programs;
   inputting, into the first product manufacturing program, an operating parameter of a product manufacturing device configured to manufacture the target product when manufacturing the target product, to simulate manufacturing of the target product, so as to obtain a first product parameter of a first product obtained after the simulating, and comparing the first product parameter with a standard product parameter to obtain a first comparison result; and
   determining the first product manufacturing program as a first target product manufacturing program, when the first comparison result is that the first product parameter is same as the standard product parameter, so that the automated product manufacturing system manufactures the target product according to the first target product manufacturing program.

2. The method according to claim 1, wherein after the comparing the first product parameter with the standard product parameter to obtain a first comparison result, the method further comprises:
   inputting the operating parameter into a second product manufacturing program to simulate the manufacturing of the target product, when the first comparison result is that the first product parameter is different from the standard product parameter, so as to obtain a second product parameter of a second product obtained after the simulating, and comparing the second product parameter with the standard product parameter to obtain a second comparison result, wherein the second product manufacturing program is a product manufacturing program obtained by the target user modifying the first product manufacturing program according to the first comparison result; and
   determining the second product manufacturing program as a second target product manufacturing program, when the second comparison result is that the second product parameter is same as the standard product parameter, so that the automated product manufacturing system manufactures the target product according to the second target product manufacturing program.

3. The method according to claim 1, after the determining the first product manufacturing program as a first target product manufacturing program, the method comprises:
   determining, according to a product type identifier configured for the first target product manufacturing program, a server partition with the same product type identifier as the first target product manufacturing program, from a server configured to store product manufacturing programs, and encrypting the first target product manufacturing program, and then uploading it to the server partition for storage.

4. The method according to claim 1, before the step of determining according to an information identifier configured for describing target key information of the product manufacturing requirement of the target user a first product manufacturing program with the same information identifier as the target key information from a product manufacturing program library used to store product manufacturing programs, the method further comprises:
   inputting, into a trained requirement analysis model, a text inputted by the target user used to describe the product manufacturing requirement, to obtain a target keyword used to describe the product manufacturing requirement, and configuring a device type of the product manufacturing device as an information identifier of the target keyword.

5. An apparatus for determining a product manufacturing program, comprising:
   a first product manufacturing program determination module, configured to determine, according to an information identifier configured for describing target key information of the product manufacturing requirement of the target user, a first product manufacturing program with the same information identifier as the target key information, from a product manufacturing program library used to store product manufacturing programs;
   a first comparison result determination module, configured to input, into the first product manufacturing program, an operating parameter of a product manufacturing device configured to manufacture the target product when manufacturing the target product, to simulate manufacturing of the target product, so as to obtain a first product parameter of a first product obtained after the simulating, and compare the first product parameter with a standard product parameter to obtain a first comparison result; and
   a first target product manufacturing program determination module, configured to determine the first product manufacturing program as a first target product manufacturing program, when the first comparison result is that the first product parameter is same as the standard product parameter, so that the automated product manufacturing system manufactures the target product according to the first target product manufacturing program.

6. The apparatus according to claim 5, wherein the apparatus comprises:
a second comparison result determination module, configured to input the operating parameter into the second product manufacturing program to simulate the manufacturing of the target product, after comparing the first product parameter with the standard product parameter to obtain a first comparison result and when the first comparison result is that the first product parameter is different from the standard product parameter, so as to obtain a second product parameter of a second product obtained after the simulating, and compare the second product parameter with the standard product parameter to obtain a second comparison result, wherein the second product manufacturing program is a product manufacturing program obtained by the target user modifying the first product manufacturing program according to the first comparison result; and
a second target product manufacturing program determination module, configured to determine the second product manufacturing program as a second target product manufacturing program, when the second comparison result is that the second product parameter is same as the standard product parameter, so that the automated product manufacturing system manufactures the target product according to the second target product manufacturing program.

7. The apparatus according to claim 5, wherein the apparatus comprises:
a first target product manufacturing program storage module, configured to determine, according to a product type identifier configured for the first target product manufacturing program, a server partition with the same product type identifier as the first target product manufacturing program, from a server configured to store product manufacturing programs, and encrypt the first target product manufacturing program, and then upload it to the server partition for storage.

8. The apparatus according to claim 5, wherein the apparatus comprises:
an information identifier configuration module, configured to input, into a trained requirement analysis model, a text inputted by the target user used to describe the product manufacturing requirement to obtain a target keyword used to describe the product manufacturing requirement, and configure a device type of the product manufacturing device as an information identifier of the target keyword, before the determining according to an information identifier configured for describing target key information of the product manufacturing requirement of the target user a first product manufacturing program with the same information identifier as the target key information from a product manufacturing program library used to store the product manufacturing program.

9. A computer device, comprising: a processor, a memory, and a bus, wherein the memory stores machine-readable instructions executable by the processor, and when the computer device runs, the processor and the memory communicate with each other through the bus, when the machine-readable instructions are executed by the processor, the steps of the method for determining a product manufacturing program according to claim 1 are executed.

* * * * *